Nov. 4, 1958 — E. ROLF — 2,859,401
FLUX REVERSAL CIRCUITS FOR RECTIFIERS
Filed Feb. 4, 1955 — 3 Sheets-Sheet 1
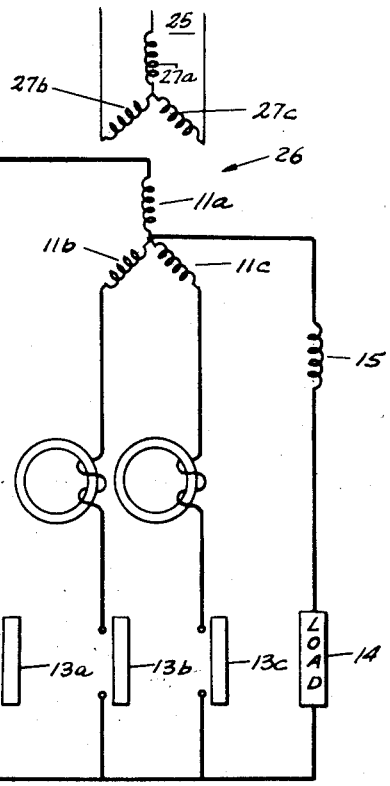
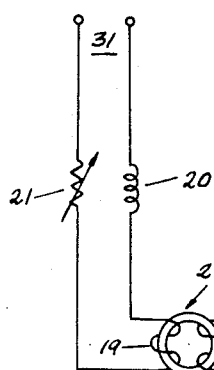
FIG. 1
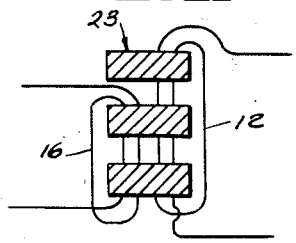
FIG. 5
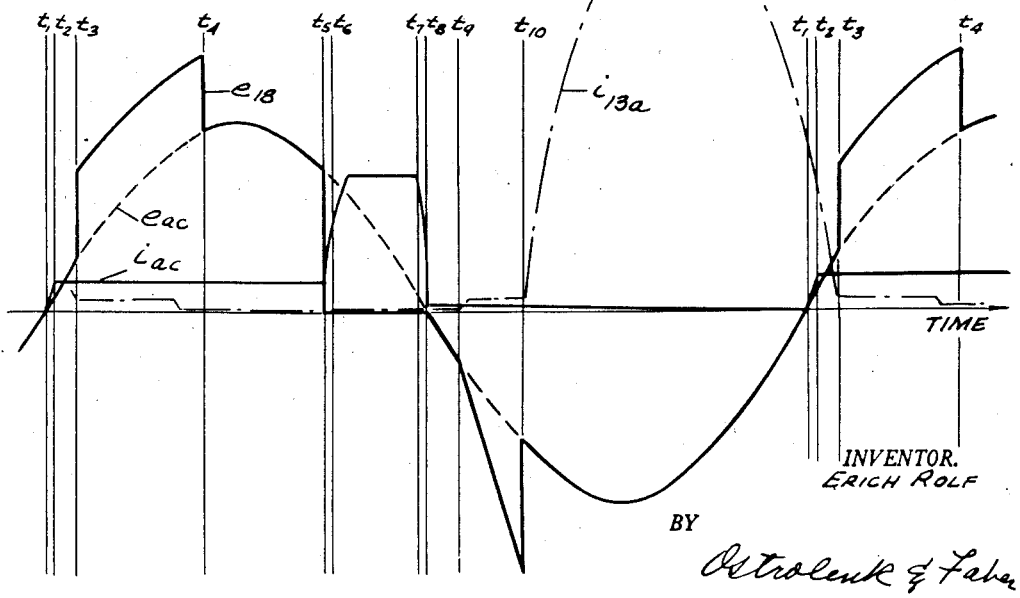
FIG. 4
INVENTOR.
ERICH ROLF
BY Ostrolenk & Faber
ATTORNEYS

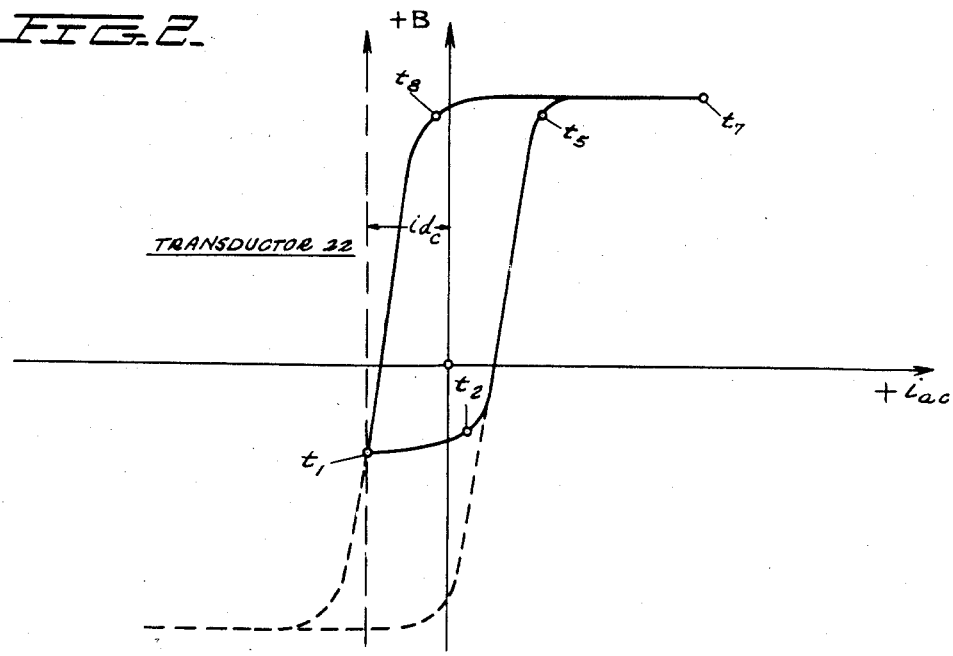
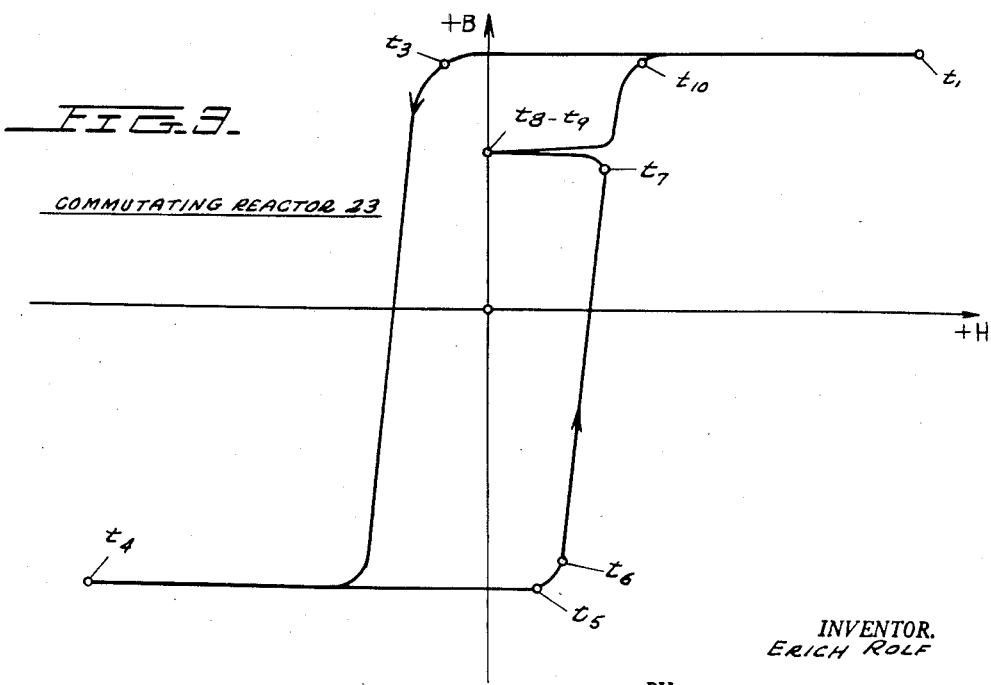

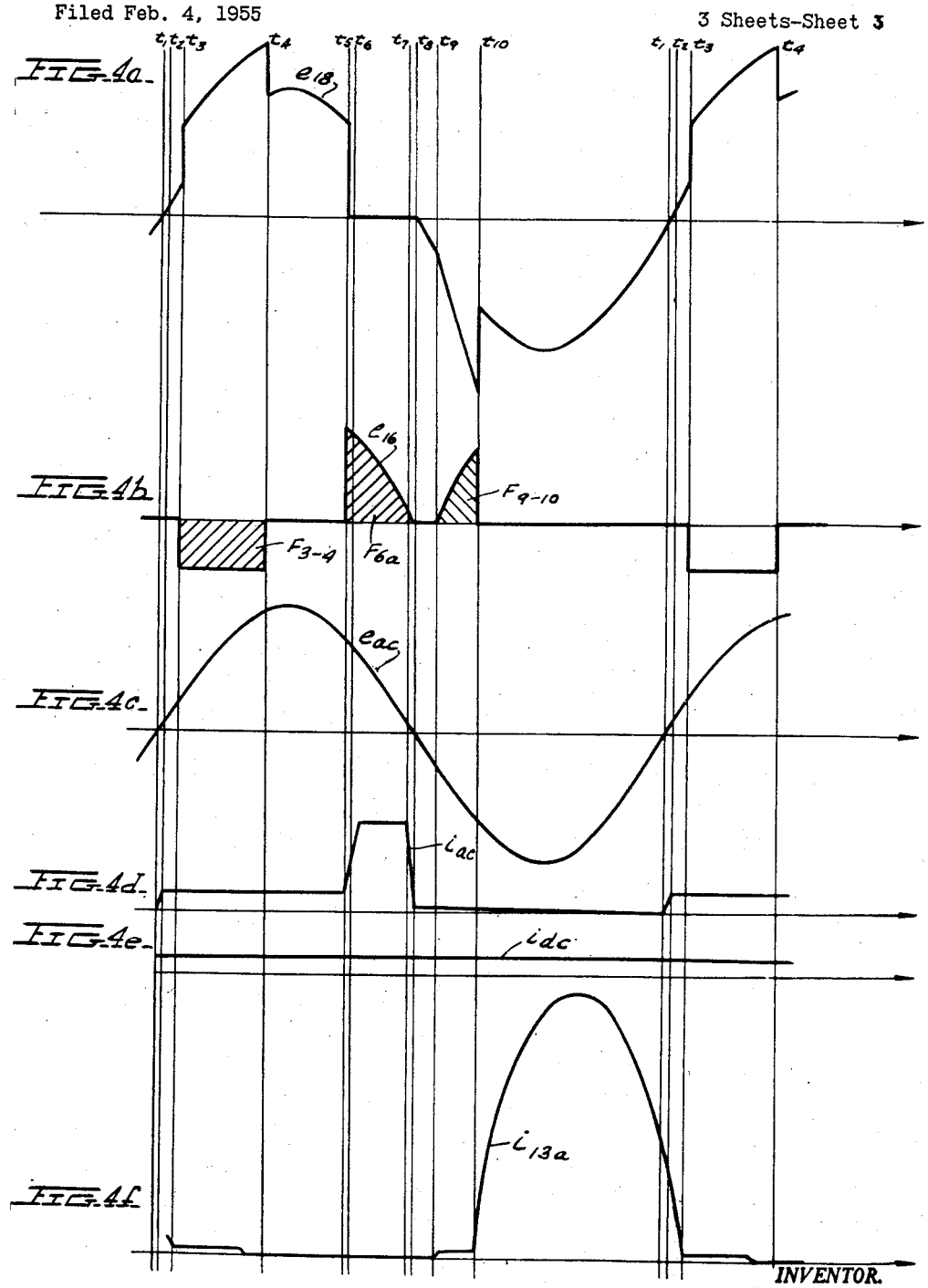

United States Patent Office 2,859,401
Patented Nov. 4, 1958

2,859,401

FLUX REVERSAL CIRCUITS FOR RECTIFIERS

Erich Rolf, Nurnberg, Germany, assignor to Siemens-Schuckertwerke A. G., Berlin, Germany, a corporation of Germany Application February 4, 1955, Serial No. 486,243

13 Claims. (Cl. 321—48)

My invention relates to flux reversal circuits for rectifiers and is more particularly directed to novel circuitry whereby voltage control as shown in copending application Serial No. 423,358 filed April 15, 1954, now Patent No. 2,817,805, for mechanical and electromagnetic rectifiers is readily and easily achieved by controlling the length of the commutating reactor make step.

Basically, my novel circuit permits flux reversal in the main commutating reactor so that during the subsequent make step, the core of the commutating reactor is only partially magnetized before the core becomes completely saturated. That is, by preconditioning the commutating reactor with my novel flux reversal circuit, the length of the make step can be appreciably reduced since the core of the commutating reactor has already been partially magnetized.

Without any flux reversal following the break of the contacts, a make step will occur as soon as these contacts are again closed which make step will have a duration as long as the break step and therefore produce a voltage drop of about thirty (30%) percent in the average mechanical rectifier.

On the other hand, if the flux of the commutating reactor is completely reversed, then no make step will occur on the closing of the contacts and hence, the rectifier output will be at its full voltage. However, with this latter arrangement, there is no protection for the contacts during the closing operation and hence, they will eventually burn out due to the lack of a make step in the current. Therefore, in order to obtain optimum conditions of operation of the rectifier, it is necessary to compromise between a long make step and no make step at all.

With my novel control circuitry, I obtain a variable make step period by varying the amount of the flux reversal in the core of the commutating reactor to thereby permit voltage control in the range of from one hundred (100%) percent to about seventy (70%) percent of the maximum possible output voltage.

Basically, my invention is comprised of a transductor having a D.-C. biasing winding and an output winding which is connected in series with a rectifier and a flux reversal winding of the main commutating reactor.

The series combination of the transductor output winding, the rectifier, and the flux reversal winding of the commutating reactor is energized from an A.-C. source.

The D.-C. winding of the transductor serves to control the transductor so as to alter its hysteresis range of operation on the hysteresis loop.

By altering the magnitude of the D.-C. biasing current, both the time of pulse occurrence and duration of the pulse can be adjusted to thereby alter the degree of flux reversal for the main commutating reactor. By changing the degree of flux reversal of the main commutating reactor, the duration of the make step of this reactor is automatically varied.

With my novel arrangement, I am able to control the transductor with a D.-C. biasing circuit which is magnetically and electrically independent of the commutating reactor.

As mentioned above, an accessory rectifier is placed in the flux reversal circuit which is comprised of the series combination of an alternating current source, output winding of the transductor and flux reversal winding of the commutating reactor. By inserting the accessory rectifier in the flux reversal circuit, current will flow through the flux reversal winding in only one direction. Since either the transductor or the commutating reactor will be unsaturated during the positive half cycle of the voltage feeding the flux reversal circuit, the magnitude of current flowing through the flux reversal winding will be small and maintained at step value.

By providing an arrangement in which the magnitude of current flowing through the flux reversal winding prior to the flux reversal operation is maintained at a minimum value, the necessity of a neutralizing winding for the commutating reactor is eliminated. Hence, the construction of the commutating reactor is simplified thereby reducing its expanse and complexity.

Accordingly, a primary object of my invention is to provide a novel circuit arrangement incorporating a series connected rectifier whereby the degree of flux reversal of the main commutating reactor can be varied.

Another object of my invention is to provide a mechanical or electromagnetic rectifier with a novel flux reversal circuit which can maintain the duration of the make step at a minimum value to thereby achieve an operation of the rectifier with the maximum D.-C. output voltage allowed.

Another object of my invention is to provide a novel arrangement whereby a transductor is used to control the degree of magnetization of a core of a commutating reactor so as to insure flux reversal prior to the occurrence of a make step.

A still further object of my invention is to provide a novel flux reversing circuit with a series connected rectifier wherein the control of the magnitude of the D.-C. biasing voltage automatically controls the duration of the make step of the main commutating reactor to thereby achieve voltage control in the range of 100% to 70% of the possible output voltage.

Still another object of my invention is to provide a novel arrangement wherein an accessory rectifier is positioned in series in the flux reversal circuit to insure that the current will only flow in one direction therethrough.

Still a further object of my invention is to provide a flux reversal circuit with a series connected accessory rectifier wherein the energizing voltage is in proper phase relationship with the main source voltage so that the unsaturated condition of the transductor will maintain the current in the flux reversal circuit at a minimum thereby eliminating the necessity of a neutralizing winding for the commutating reactor.

As heretofore noted, a complete flux reversal of the core of the commutating reactor, although resulting in a maximum voltage control, would result in the destruction of the cooperating contacts since there would be no current step during the closing period of the contacts. Thus, although it is desirable to provide means whereby the length of the make step can be varied, it is essential to also provide safety means to insure that the flux linkage of the commutating reactor does not completely reverse the magnetization thereof prior to the engagement of the contacts. That is, means are provided to insure that the flux reversal circuit is prevented from completely reversing the flux of the commutating reactor during the flux reversal period so that an operator can not inadvertently decrease the length of the make step to zero.

In my novel arrangement, I provide a circuit in which the flux reversal winding links only a portion of the core of the commutating reactor so that irrespective of the degree of flux magnitude due to the flux reversal winding, the core of the commutating reactor can not be brought from the negative saturated point to the positive saturated point prior to the engagement of the contacts. Thus, an automatic safety means is included in the circuit so that the length of the make step can only be reduced to a predetermined minimum length to thereby insure that the contacts will not be destroyed.

Accordingly, a further object of my invention is to provide a novel flux reversal circuit having an accessory rectifier in series with a flux reversal winding in which the flux reversal winding links only a portion of the core of the commutating reactor to provide automatic safety means for the main rectifier.

Another object of my invention is to provide a novel arrangement wherein the flux reversal winding of the flux reversal circuit is rendered ineffective to cause complete flux reversal of the commutating reactor.

Another object of my invention is to provide a main rectifier with an auxiliary circuit which can change the degree of voltage control within predetermined limits.

Still another object of my invention is to provide a commutating reactor in which its flux reversal winding limits only a portion of the core thereof to prevent complete flux reversal prior to the engagement of the main contacts.

These and other objects of my invention will be apparent from the following description when taken in connection with the drawings in which:

Figure 1 is a circuit diagram of my invention and illustrates the flux reversal circuit which is associated with any one phase of a three phase mechanical rectifier.

Figure 2 illustrates the hysteresis characteristics of the transductor used in my novel circuit and also illustrates the altered charcteristics achieved by the biasing circuit.

Figure 3 is an illustration of the hysteresis characteristics of the commutating reactor and particularly illustrates the occurrence of flux reversal as a result of my invention.

Figure 4 is a composite current and voltage curve plotted against time and shows the conditions existing within my novel circuit at all times during any one cycle.

Figures 4a, 4b, 4c, 4d, 4e and 4f are individual plots of voltage or current curves versus time and show the electrical conditions illustrated in the composite illustration of Figure 4.

Figure 4a is a voltage versus time curve illustrating the voltage occurring across the control winding of the transductor 22 at all times during any one cycle.

Figure 4b is a voltage versus time curve of the voltage conditions existing on the flux reversal winding of the commutating reactor.

Figure 4c is a voltage versus time curve illustrating the A.-C. voltage applied to the series combination on the control winding for the transductor, the rectifier and the flux reversal winding of the commutating reactor of my novel circuit.

Figure 4d is a current versus time curve illustrating the current conditions existing in the flux reversal circuit of my invention.

Figure 4e is a current versus time curve illustrating the D.-C. voltage applied to the biasing winding of the transductor.

Figure 4f is a current versus time curve illustrating the current flow through the main contacts of the rectifier.

Figure 5 is a side view of the commutating reactor 23 and illustrates the manner in which the flux reversal winding 16 couples only a portion of the core thereto.

Referring now to Figure 1, I have shown a three phase mechanical rectifier to which my flux reversal circuit may be applied.

It will be apparent to those skilled in the art that my novel circuit can also be applied to an electromagnetic rectifier in substantially the same manner as will hereinafter be described.

The main A.-C. source 25 is applied to the primary windings 27a, 27b and 27c of the star connected three phase transformer 26. The secondary windings 11a, 11b and 11c of the transformer 26 are respectively connected to the main winding 12 of commutating reactor 23 and have the mechanically operated contacts 13 connected in series therewith. The series combination of the mechanically operated contacts 13 and the main commutating reactor winding 12 are in turn connected to the one end of the load 14. The opposite end of the load 14 is connected to a smoothing choke 15 which in turn is connected to the secondary neutral of the transformer 26.

I have illustrated my invention as applied to phase A of the rectifier as it will be apparent that the identical circuitry will also be applied to the commutating reactors of phases B and C.

The commutating reactor 23 is provided with a flux reversal winding 16 which is connected in series with the accessory rectifier 17 and an output winding 18 of the transductor 22.

The magnetic portion of the commutating reactor 23 is comprised of a portion of stacked circular cores, a side view of which is seen in Figure 5. The main winding 12 of the rectifier links all of the various cores of the commutating reactor 23. However, the flux reversal winding 12 only links a portion of the magnetic path of the commutating reactor 23, as seen in Figure 5.

As will hereinafter be apparent, by providing an arrangement wherein the flux reversal winding only controls a portion of the magnetic cross-sectional area of the commutating reactor, it is impossible to obtain complete flux reversal prior to the engagement of the main contacts. That is, since the flux reversal winding can not control the flux linkage for the entire core of the commutating reactor, it will never be possible to completely reverse the flux of the commutating reactor core from the point indicated by $t_5$ to the point indicated by $t_1$ in Figure 3 at a time prior to the engagement of the main contacts. That is, even though the ampere turns of the flux reversal winding 16 is of a large magnitude, there will always be a remaining portion of the core which has no flux reversal winding 16 and hence, can not be saturated in the positive direction. By providing this novel arrangement, it is possible to insure that there will always be a predetermined minimum make step length when the main contacts close.

The series combination of the flux reversal winding 16, the rectifier 17 and the output winding 18 are energized from the alternating current source 30. The transductor 22 has a biasing winding 19 which is energized from a direct current source 31 through variable resistor 21 and reactor 20. The D.-C. circuit comprising the D.-C. source 31, the reactor 20, variable resistor 21 and the D.-C. biasing winding 19 is used to control the transductor 22 i. e., to alter its range of operation of the hysteresis loop.

It will be noted that the rectifier 17 may be a diode or any other type sufficient to prevent reverse flow of current when subjected to the voltage $e_{ac}$.

As seen in Figure 2, the normal hysteresis characteristics of the core of the transductor 22 is substantially symmetrical in shape. By providing the D.-C. biasing winding 19 for the transductor 22, the vertical axis of the hysteresis loop is moved to the left, as clearly seen in Figure 2.

Since the rectifier 17 is inserted in series with the output winding 18 of the transductor 22 and the flux reversal winding 16 of the commutating reactor 23, the current flowing in the circuit can only flow in a forward direction and can not flow in a reverse direction. Thus, as clearly seen in Figure 2, the D.-C. biasing circuit plus the rectifier 17 changes the hysteresis characteristics of the core of the transductor 22 from that shown by the dotted line of Figure 2 to that shown in the solid lines of Figure 2.

Thus, it will be apparent that by increasing the magnitude of the D.-C. biasing current by varying the impedance of the resistor 21, the net area enclosed by the hysteresis loop of the transductor core 22 can be increased.

In like manner, by reducing the magnitude of the D.-C. biasing current $i_{dc}$, the net area enclosed by the hysteresis loop can be reduced.

As will hereinafter be more fully explained and apparent, the magnitude of D.-C. biasing current $i_{dc}$ will control the degree of flux reversal of the commutating reactor 23.

Referring now to Figures 4a, 4b, 4c, 4d and 4e in connection with Figures 1, 2 and 3, an explanation of the operation of my novel flux reversal circuit will now be given.

At time $t_1$, the current flowing in the flux reversal circuit $i_{ac}$ is zero. The voltage $e_{ac}$ applied to the flux reversal circuit is passing through zero and on increase at this time. Due to the increase in voltage $e_{ac}$, the current $i_{ac}$ will start to increase, as clearly seen during the interval of time between $t_1$ and $t_2$.

As clearly seen in Figure 2 at time $t_2$, the core of the transductor 22 is unsaturated. Hence, at this time, the impedance of the output winding 18 will be at a maximum value and all of the alternating current voltage $e_{ac}$ will exist across this winding. Since this winding is at a maximum impedance at this period of time, it will limit the magnitude of the current permitted to flow in the flux reversal circuit and hence, the current $i_{ac}$ will be stepped to a minimum value, as seen in Figures 4 and 4d.

The core of the transductor 22 will remain unsaturated until the time $t_5$, as seen in Figure 2, and the resultant step current will continue until that time, as seen in Figures 4 and 4d. However, during the interval between time $t_3$ to $t_4$ within the period $t_2$ to $t_5$ when the core of the transductor 22 is unsaturated the core of the commutating reactor 23 will unsaturate, as seen in Figure 3. Thus, during this interval of time from $t_3$ to $t_4$ when the core of the commutating reactor 23 is unsaturated, an additional voltage will be impressed on the flux reversal circuit. That is, since the commutating reactor 23 is going through a step during this period of time, a large voltage will occur across its main winding 12. This voltage will be transformed to the flux reversal winding 16 by direct transformation during this interval of time. Hence, the voltage in the flux reversal circuit will not only be the voltage $e_{ac}$ but also the voltage which is transformed from the main commutating reactor winding 12 to the flux reversal winding 16 during the period of time when the core of the commutating reactor 23 is unsaturated.

Accordingly, during the interval between $t_3$ to $t_4$, there will be a large positive voltage on the output winding 18 of the transductor 22, as seen in Figures 4 and 4a, and a negative voltage on the flux reversal winding 16 of the commutating reactor 23, as seen in Figure 4b.

The area enclosed by the voltage wave $e_{16}$ during the time period from $t_3$ to $t_4$ represents the flux linkage of the core of the commutating reactor 23. This is, since therefore, $$e = -N\frac{d\phi}{dt} \text{ then } edt = Nd\phi$$

therefore, $$F_{3-4} = \int_{t_3}^{t_4} e_{16} dt = N\Delta\phi$$

Designating the flux linkage of the core of the commutating reactor 23 from the time interval $t_3$ to $t_4$, $F_{3-4}$, it will be seen that the core of the commutating reactor is changed from complete positive saturation to complete negative saturation by the flux linkage $F_{3-4}$, as seen in Figure 3. Thus, at time $t_4$, the commutating reactor 23 is again saturated and hence, the impedance of the flux reversal winding 16 is a negligible value.

From the time $t_4$ to $t_5$, the core of the commutating reactor 23 remains saturated. However, at the time $t_5$, as seen in Figure 3, the core of the transductor 22 becomes saturated and the core of the commutating reactor 23 commences to unsaturate, as seen in Figure 3. Hence, the conditions are completely reversed and the impedance of the output winding 18 decreases to a negligible value and the impedance of the flux reversal winding 16 increases to a large value. Hence, all of the applied voltage $e_{ac}$ will now exist across the flux reversal winding 16 as seen in Figures 4 and 4a.

During the transmitting interval at time $t_5$, the current $i_{ac}$ will attempt to rise rapidly. That is, as soon as the core of the transductor 22 saturates, the current $i_{ac}$ will attempt to go up to a large value. This ocurs during the period of time from $t_5$ to $t_6$. However, since the core of the commutating reactor 23 now becomes unsaturated, the magnitude of the current rise will be limited and hence, the current $i_{ac}$ will be stepped during the interval of time from $t_6$ to $t_7$, as seen in Figures 4 and 4d.

Thus, it will be noted that during the period of time from $t_5$ to $t_8$, all of the voltage $e_{ac}$ will exist across winding 16.

As heretofore noted, the voltage-time area is representative of the flux linkage of the core of the commutating reactor 23. Hence, the flux linkage $F_{6a}$ indicated in Figure 4b will be effective to partially reverse the flux of the commutating reactor 23, as seen in Figure 3. That is, the flux linkage will be effective to change the condition of the core of the commutating reactor from complete negative saturation, as seen at point $t_5$, to the unsaturated condition, seen at point indicated by $t_8$ to $t_9$.

It will be noted that the conditions described up till the time $t_9$ occur prior to the closing of the main contacts 13a. Thus, my novel circuit has provided a partial flux reversal for the commutating reactor 23 so that the magnitude of flux linkage required to bring the commutating reactor from the unsaturated condition to the saturated condition indicated at point $t_{10}$ and $t_1$ is a relatively small amount. Hence, the length of the make step will accordingly be small to thereby substantially increase the D.-C. output voltage.

As heretofore noted at time $t_5$, the core of the commutating reactor 23 will now saturate, as seen in Figure 3, and hence, the flux reversal winding 16 will have a large impedance to thereby substantially reduce the magnitude of the current $i_{ac}$. Thus, between the times $t_5$ and $t_8$, the current $i_{ac}$ will be reduced to a small value, as seen in Figures 4 and 4d.

During the period of time from $t_8$ to $t_9$, a very low magnitude of current will flow in the circuit due to the unsaturation of the transductor 22 and hence, the flux linkage of the commutating reactor 23 will not be affected by the current $i_{ac}$, as seen in Figure 3.

Accordingly, during the period of time from $t_8$ to $t_9$, all of the voltage $e_{ac}$ will occur across the output winding 18, as seen in Figures 4 and 4a.

At time $t_9$, the contacts 13a will be closed by some internal means, as for example by a synchorous motor as is well known in the mechanical rcetifier art or in the magnetic means as is well known in the electromagnetic rectifier art.

As soon as the contacts 13a close, a large inrush current will attempt to flow in the main circuit of the mechanical rectifier from the secondary winding 11a to the main commutating reactor winding 12 through the closed contacts 13a. However, since the core of the commutating reactor 23 is unsaturated at the time $t_9$, its main winding 12 will have a high impedance and thereby step the current $t_{13a}$, as seen in Figure 4, so that the contacts 13a can completely close before a large inrush current flows therethrough and thereby prevents any damage to the contacts.

The length of the step of the current in the path 11a, 12, 13a will be determined by degree of flux reversal of the commutating reactor 23 which occur during the interval of time from $t_5$ to $t_8$. Hence, as clearly seen in Figure 3, a relatively small amount of flux linkage will be required to saturate the core of the commutating reactor 23. Thus, the length of the step current protecting the main contacts 13a will be relatively small. This step will exist from the time $t_9$ to time $t_{10}$.

Since both the transductor 22 and the commutating reactor 23 are unsaturated during this interval of time, both will have a relatively high impedance and the voltage occurring across the main winding 12 will be transformed to the flux reversal winding 16 since the core is in an unsaturated condition. During this period of time, the output winding 18 will have a relatively large negative voltage existing thereacross, as seen in Figures 4 and 4a, and the flux reversal winding will have a positive voltage existing thereacross, as seen in Figures 4 and 4b.

It will be noted that the voltage-time area of $e_{16}$ of Figures 4 and 4b is relatively small. This is a result of the prior partial flux reversal of the commutating reactor. As heretofore noted, the voltage-time area is the equivalent of the flux linkage of the core 23. Hence, $F_{9-10}$ occurring during the period $t_9$ to $t_{10}$ need only be a small amount to bring the core of the commutating reactor 23 from the unsaturated condition to complete positive saturation, as seen in Figure 3.

As heretofore noted, this will result in a relatively small make step period, as seen in Figure 4f for the contacts 13a to thereby achieve maximum voltage control of the circuit.

At time $t_{10}$, the core of the commutating reactor 23 will be completely saturated in the positive direction and hence, the impedance of the winding 16 will be negligible. As a result thereof, since the impedance of the rectifier 17 is infinitesimal, all of the voltage $e_{ac}$ will exist across the control winding 18, as seen in Figures 4 and 4a.

At the time $t_1$ when the voltage $e_{ac}$ has decreased from its negative value to zero, the cycle will repeat itself in a manner heretofore described.

As heretofore noted, the moment of time when the transductor 22 saturates in the positive direction will determine the magnitude of flux linkage to achieve flux reversal of the commutating reactor 23.

Thus, as seen in Figures 4 and 4b, if the transductor 22 saturates before the time indicated by $t_5$, then the voltage-time area or flux linkage $F_{6a}$ will be substantially increased thereby increasing the degree of flux reversal of the core of the commutating reactor 23. If the degree of flux reversal is thereby increased, then the flux linkage required following the time $t_9$ to bring the core of the commutating reactor 23 to complete positive saturation will be small and hence, the step in the current $i_{13a}$ will be substantially reduced.

Since the time within the cycle when the transductor 22 will saturate is determined by the magnitude of the D.-C. biasing current $i_{dc}$, it will be seen that a relatively simple control means can be provided to vary the length of the make step of the current $i_{13a}$. Thus, for example, by varying the magnitude of the resistor 21 to decrease the magnitude of the D.-C. bias of the current $i_{dc}$ of the transductor 22, the vertical axis of the hysteresis loop indicated in Figure 2 will be moved to the right. Hence, the transductor 22 will be saturated at an earlier point in the cycle to thereby increase the flux linkage of the commutating reactor 23 and accordingly, increase the degree of flux reversal which in turn will result in a shorter make step period for the current $i_{13a}$.

In like manner, the length of the make step of the current $i_{13a}$ can be increased by varying the magnitude of the resistance 21. That is, by increasing the magnitude of the D.-C. biasing current $i_{dc}$, the vertical axis of the hysteresis loop of the transductor 22 will be moved to the left thereby resulting in a condition wherein the core is saturated at a later time within the cycle than is indicated in Figure 4. Hence, the magnitude of flux linkage and degree of flux reversal will accordingly be reduced automatically resulting in a longer make step for the current $i_{13a}$.

As heretofore noted, I have provided safety means for the rectifier so that complete flux reversal can never be achieved. That is, unless additional means are provided, it is conceivable that the magnitude of the resistance 21 could be made so small that the resulting large magnitude $i_{dc}$ would result in a flux linkage sufficient to completely reverse the commutating reactor 23 from negative saturation to positive saturation.

In order to avoid this contingency and insure that a predetermined make step length will always occur, the flux reversal winding 16 links only a portion of the core of the commutating reactor 23. Hence, as seen in Figure 5, the flux reversal winding 16 will have little or no effect on the portion of the commutating reactor core indicated in the uppermost portion thereof and hence, the possibility of complete flux reversal is eliminated.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a rectifier having a commutating reactor, main contacts and a transductor; said commutating reactor comprising a magnetic core, a main winding and a flux reversal winding; said main winding linking the entire magnetic core of said commutating reactor and connected in series with said main contacts; said flux reversal winding linking a portion of said magnetic core of said commutating reactor; said transductor comprising a magnetic circuit, a biasing winding and an output winding; said output winding and said biasing winding linking said magnetic circuit; said output winding connected in series with a rectifier and said flux reversal winding; an alternating current source energizing said series combination of said output winding, said rectifier and said flux reversal circuit; a direct current source energizing said biasing winding.

2. In a rectifier having a commutating reactor, main contacts and a transductor; said commutating reactor comprising a magnetic core, a main winding and a flux reversal winding; said main winding linking the entire magnetic core of said commutating reactor and connected in series with said main contacts; said flux reversal winding linking a portion of said magnetic core of said commutating reactor; said transductor comprising a magnetic circuit, a biasing winding and an output winding; said output winding and said biasing winding linking said magnetic circuit; said output winding connected in series with a rectifier and said flux reversal winding; an alternating current source energizing said series combination of said output winding; said rectifier and said flux reversal circuit; a direct current source energizing said biasing winding; means to adjust the magnitude of current flowing in said direct current biasing winding; said means effective to adjust the length of the make step for said main contact.

3. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with a rectifier and an alternating current source; said biasing winding connected in series with a variable impedance and a direct current source; said main winding of said commutating reactor connected in series with said main contacts; said variable impedance effective to adjust the make step for said main contacts.

4. A rectifier having a commutating reactor, main contacts and a transductor; said commutating reactor having a flux reversal winding and a main winding; said transductor having a biasing winding and an output winding; said transductor output winding and said commutating reactor flux reversal winding connected in series with an accessory rectifier and an alternating current source; said biasing winding connected in series with a variable impedance and a direct current source; said main winding of said commutating reactor connected in series with said main contacts; said variable impedance effective to adjust the D.-C. voltage of said rectifier.

5. In a rectifier having a commutating reactor, main contacts and a transductor; said commutating reactor having a magnetic circuit, a main winding and a flux reversal winding; said main winding connected in series with said main contacts; said transductor having a biasing winding and an output winding; said output winding connected in series with said flux reversal winding and an accessory rectifier for energization from an alternating current source; said biasing winding controlling said transductor to permit the current flowing in said series circuit of said output winding, said accessory rectifier and said flux reversal winding to cause a partial flux reversal in said magnetic circuit of said commutating reactor; said flux reversal winding wound on only a portion of the cross-sectional area of said magnetic circuit of said commutating reactor to prevent complete flux reversal therein.

6. A flux reversal circuit for a mechanical rectifier comprising a transductor, a biasing winding, an output winding, a rectifier, and a flux reversal winding; said biasing winding and said output winding magnetically associated with said transductor; said biasing winding energized from a direct current source; said output winding, said rectifier and said flux reversal winding connected in series with an alternating current source; said flux reversal winding controlling a flux linkage of a commutating reactor for said mechanical rectifier; said direct current source and said biasing winding controlling said transductor to determine the magnitude of said flux linkage.

7. A flux reversal circuit for a mechanical rectifier comprising a transductor, a biasing winding, an output winding, a rectifier, and a flux reversal winding; said biasing winding and said output winding magnetically associated with said transductor; said biasing winding energized from a direct current source; said output winding, said rectifier and said flux reversal winding connected in series with an alternating current source; said flux reversal winding controlling the flux linkage for a portion of a commutating reactor associated with said mechanical rectifier.

8. A flux reversal circuit for a mechanical rectifier comprising a transductor, a biasing winding, an output winding, a rectifier, and a flux reversal winding; said biasing winding and said output winding magnetically associated with said transductor; said biasing winding energized from a direct current source; said output winding, said rectifier and said flux reversal winding connected in series with an alternating current source; said flux reversal winding controlling the flux linkage for a portion of a commutating reactor associated with said mechanical rectifier; means to vary the magnitude of current flow from said direct current source to said biasing winding; said means adjustable to control the magnitude of said flux linkage.

9. In a rectifier having contacts with an engaged and disengaged position, a commutating reactor and a transductor; said commutating reactor having a main winding connected in series with said contacts; said transductor having an output winding connected in series with a flux reversal winding of said commutating reactor; an accessory rectifier connected in series with an alternating current source and said series combination of said output winding and said flux reversal winding; said accessory rectifier permitting current flow in only one direction through said output winding and said flux reversal winding; a biasing winding for said transductor energized from a direct current source to thereby control said transductor; said biasing winding energized by said direct current source through a variable impedance; said variable impedance effective to control the flux linkage of said commutating reactor prior to the engagement of said contacts.

10. In a rectifier having contacts with an engaged and disengaged position, a commutating reactor and a transductor; said commutating reactor having a main winding connected in series with said contacts; said transductor having an output winding connected in series with a flux reversal winding of said commutating reactor; an accessory rectifier connected in series with an alternating current source and said series combination of said output winding and said flux reversal winding; said accessory rectifier permitting current flow in only one direction through said output winding and said flux reversal winding; a biasing winding for said transductor energized from a direct current source to thereby control said transductor; said biasing winding energized by said direct current source through a variable impedance; said flux reversal winding of said commutating reactor linking a portion of the magnetic circuit thereto to thereby prevent complete flux reversal of said commutating reactor prior to the engagement of said contact.

11. In a rectifier having contacts with an engaged and disengaged position, a commutating reactor and a transductor; said commutating reactor having a main winding connected in series with said contacts; said transductor having an output winding connected in series with a flux reversal winding of said commutating reactor; an accessory rectifier connected in series with an alternating current source and said series combination of said output winding and said flux reversal winding; said accessory rectifier permitting current flow in only one direction through said output winding and said flux reversal winding; a biasing winding for said transductor energized from a direct current source to thereby control said transductor; said biasing winding energized by said direct current source through a variable impedance; said flux reversal winding of said commutating reactor linking a portion of the magnetic circuit thereto to thereby prevent complete flux reversal of said commutating reactor prior to the engagement of said contact; said variable impedance effective to control the flux linkage of said commutating reactor prior to the engagement of said contacts.

12. In a three phase rectifier having a flux reversal circuit associated with each phase; each phase having a main winding of a commutating reactor connected in series with a main contact having an engaged and disengaged position; said flux reversal circuit comprised of the series combination of flux reversal winding of said commutating reactor, an accessory rectifier, an output winding of a transductor, and an alternating current source; means to control said transductor to thereby control the degree of flux linkage of said saturable reactor.

13. A flux reversal circuit for a three phase rectifier; each phase of said three phase rectifier having a commutating reactor with a main winding connected in series with contacts having an engaged and disengaged position; said flux reversal circuit comprised of the series combination of a flux reversal winding for said commutating reactor, an accessory rectifier, an output winding for a transductor, and an alternating current source; electrical means to magnetically control said transductor; said electrical means being adjustable to control the magnitude of current flow through said main winding when said main contact closes.

References Cited in the file of this patent

UNITED STATES PATENTS

| | | |
|---|---|---|
| 2,188,361 | Koppelmann | Jan. 30, 1940 |
| 2,568,140 | Belamin | Sept. 18, 1951 |